United States Patent [19]

Jordan

[11] 4,415,792
[45] Nov. 15, 1983

[54] ELECTRICAL STUD WELDING DEVICE FOR WELDING STUDS OF DIFFERENT DIAMETERS WITHOUT PRE-TESTING ADJUSTING WELDS

[75] Inventor: Ernst G. Jordan, Menden, Fed. Rep. of Germany

[73] Assignee: OBO Bettermann OHG, Fed. Rep. of Germany

[21] Appl. No.: 320,747

[22] Filed: Nov. 12, 1981

[30] Foreign Application Priority Data

Mar. 9, 1981 [DE] Fed. Rep. of Germany ....... 3108891

[51] Int. Cl.³ .............................................. B23K 9/20
[52] U.S. Cl. .................................................... 219/98
[58] Field of Search .................................... 219/98, 99

[56] References Cited

U.S. PATENT DOCUMENTS 3,997,754 12/1976 Moliner et al. ....................... 219/98

Primary Examiner—C. C. Shaw
Attorney, Agent, or Firm—Jacobs & Jacobs

[57] ABSTRACT

The disclosure concerns an electrical stud-welding device with a welding head and a stud holder fastened thereto in a detachable manner. The stud-welding device is of the type that can be regulated with respect to various welding parameters, such as charging voltage, capacitance, plunge velocity, weld current, weld time, and plunge damping and providing means for weld studs of different dimensions without the need to perform test welds, thus also allowing automatic change of the stud holder, by designing the stud holder as a data carrier for several specific, variable welding-parameters, and data-acquisition units which can be acted upon by the stud holder arranged on the stud-welding device and a central, device-specific data-processing unit associated with the stud-welding device, and provided for the acquired data, which unit sets the controlled variables in accordance with the data that were determined.

7 Claims, 10 Drawing Figures

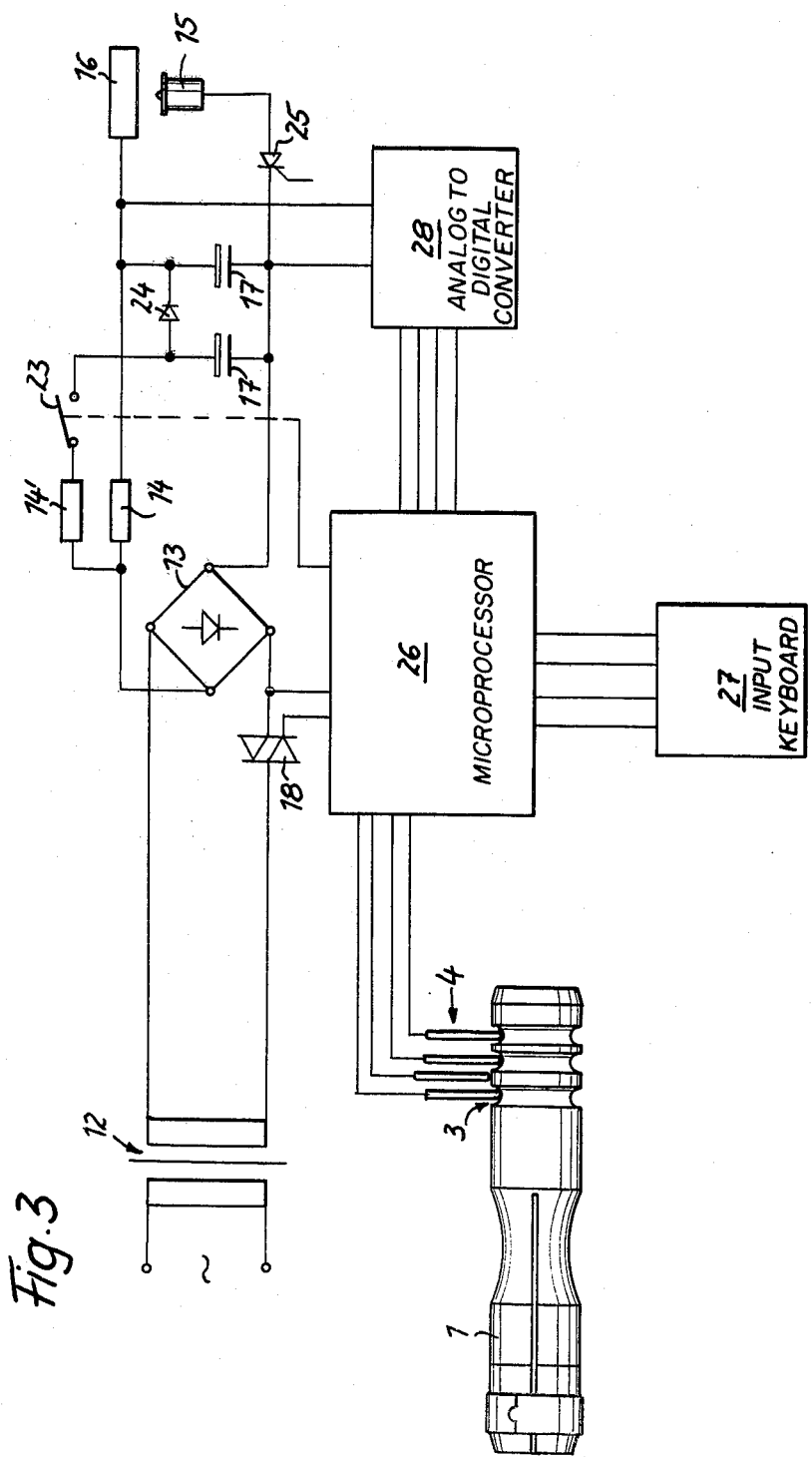

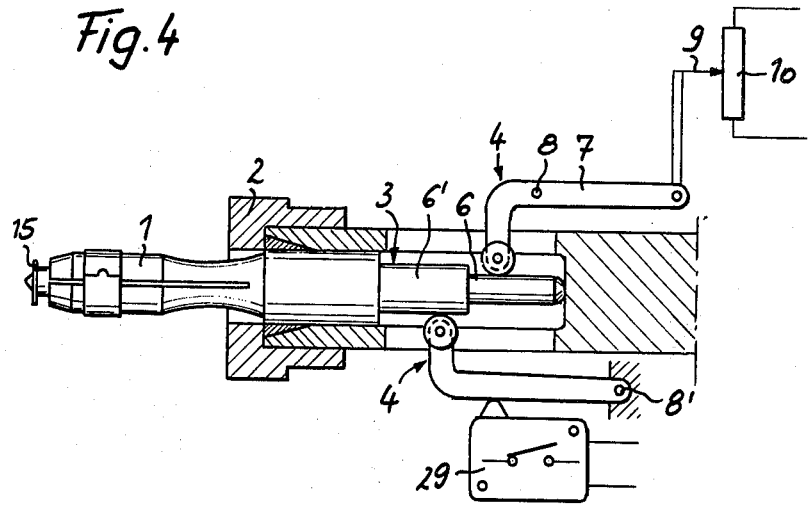
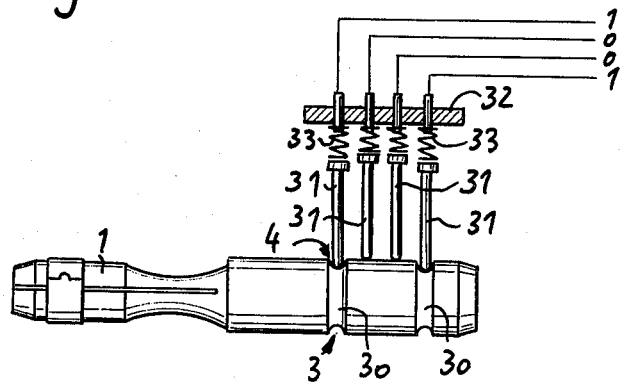
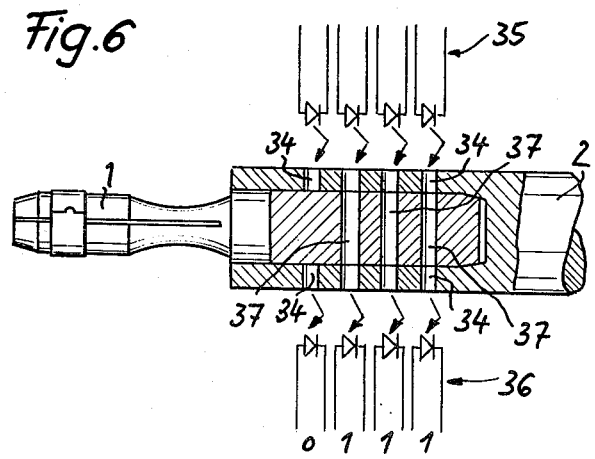

ELECTRICAL STUD WELDING DEVICE FOR WELDING STUDS OF DIFFERENT DIAMETERS WITHOUT PRE-TESTING ADJUSTING WELDS

The invention concerns an electrical stud-welding device with a welding head and a stud holder fastened thereto in a detachable manner, wherein the stud-welding device can be regulated with respect to a number of welding parameters, such as charging voltage, capacitance, plunge velocity, weld current, weld time, and/or plunge damping.

Such stud-welding devices are known. Generally, the devices operate either according to the capacitor-discharge principle, or the drawn-arc principle, or according to a combination of both. Heretofore it has been customary to replace the stud holder of the stud-welding device, whenever studs of other dimensions—particularly diameters—are to be welded. After the required stud holder has been fastened, a number of test welds are first performed for the purpose of determining the correct adjustment of the welding device in accordance with the respective stud-diameter. This procedure is very time-consuming, particularly if welding requires frequent changing to studs with other dimensions. This occurs, for instance, if several fastening components are to be welded onto one workpiece.

Accordingly the present invention relates to a stud-welding device capable of welding studs of different dimensions, without in each case having to perform test welds to determine the correct adjustment of the welding device. In particular, the invention provides a stud welding device in which the automatic changing of stud holder and associated weld-stud is possible, permitting immediate welding of the stud without prior test welds.

For that purpose the invention provides a stud holder designed as a data carrier for several specific, variable welding parameters with data-acquisition units that can be acted upon by the stud holder arranged on the stud-welding device, in particular on the welding head; and provides, for the acquired data, a central data-processng unit operatively associated with the stud-welding device, which unit sets the controlled variables in accordance with the data that were determined.

For that purpose, the stud holder is so designed that in each case it can only accommodate studs of a specific dimension. This is coupled, in the case of many possible welding procedures, with an adjustment in accordance with the welding piece that is to be provided with a stud, as specified, for instance, by DIN 32500 and 32 501. At the same time, each stud holder is a carrier of data required for each special welding procedure. The data-acquisition unit arranged on the stud-welding device, especially on the welding head, picks up the data transmitted by the stud holder and transfers them electrically to a data-processing unit.

The data-processing unit controls the controlled variables in accordance with the transmitted data. By means of the stud holder, all required parameters are thus transmitted to the welding device and the parameters set in a manner such that the welding procedure may proceed immediately, without pretest welds. This design endows the stud welding device with a much wider range of applications; thus, for instance, it is possible to build multi-range welding heads which will accommodate in a programmed automatically sequenced fashion different stud holders, with which studs of very different dimensions can be welded at high speed. For instance, in the case of welding according to the capacitor-discharge method, the stud holder transmits the following parameters:
charging voltage,
capacitance.
In the case of drawn-arc welding and similar procedures, the stud holder transmits the follwing parameters:
welding current,
welding time,
plunge damping.
Furthermore, it is possible to transmit data that involve the thickness of the basic working material, the character of the basic working material itself, and its surface characteristics.

The storage of the corresponding data on the stud holder designed as a data carrier can be effected in the most varied fashion, e.g., analogically, digitally, mechanically, optically, capacitively or inductively. The stored data are picked up by the data-acquisition unit by means of appropriate sensors or similar elements.

As a further design feature, the invention provides that the stud holder, at the end that can be inserted into an appropriate recess of the welding head, be designed as a data carrier, and that the data-acquisition units be arranged in a recess of the welding head.

In this fashion, all data to be transmitted by the data carrier can be passed on to the data-acquisition unit, immediately after the stud holder is inserted into the welding head.

It is further advantageous to have the end of the stud holder that is designed as a data carrier encompass two data-carrier blocks arranged one after the other in an axial direction, of which one block, facing the front end of the stud holder, carries data specific to the stud, while the other block, which faces away from the front end, carries specific data of the weld workpiece. As a further particularly advantageous design feature, it is proposed that the data-carrier block that carries the data of the weld workpiece be fastened to the stud holder in a detachable manner.

This makes it possible to replace the data-carrier block that carries the data of the weld workpiece with another, in accordance with the design of the workpiece. The data of the weld-stud which is to be accommodated by the stud holder always remain at the corresponding stud holder, while the latter in turn is only designed to accommodate the appropriate weld-stud.

As a further design feature the invention provides that the end of the stud holder that is designed as a data-carrier have constrictions and/or narrowings, by which associated final-control elements, functioning as data-acquisition units and arranged in the recess of the welding head, can be acted upon.

As a variant of, or in combination with, the above, it is proposed that transmitting and receiving devices, operating as data-acquisition units, be arranged in the wall of the recess in the welding head, face one another, so that the devices can be covered by the stud holder or are cleared by it, according to the programming.

As a further variant of, or in combination with, the above, it is provided that at the front end of the stud holder there are data-carriers radial and/or axial grooves or similar features, open in at least a radially outward direction, which grooves match data acquisition units such as pins, that are supported externally on the stud-welding device, so that these data-acquisition units can engage into the data carriers during the welding lift of the welding head.

In the accompanying drawings:

FIGS. 3 to 10 illustrate still further modifications of devices forming part of the invention.

Figure 1:
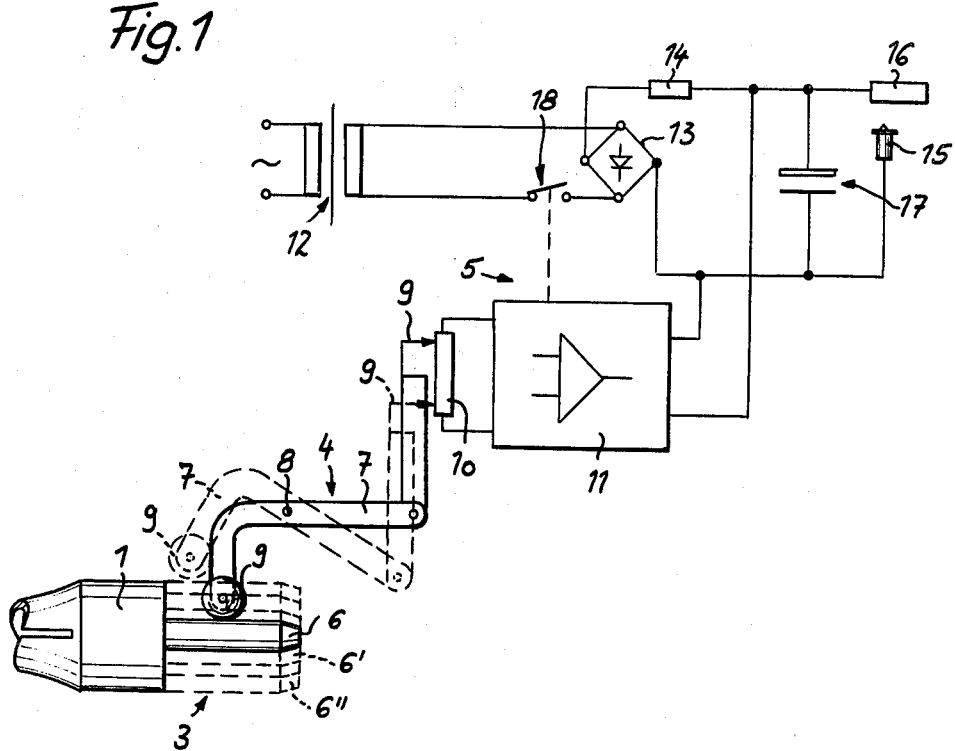
FIG. 1 illustrates diagrammatically the circuitry of the stud welding device in association with a stud to be welded according to the invention.

Essentially, the drawings illustrate to a schematic operational representation of a stud-welding device according to the invention. In the welding device, stud holder 1 is inserted and fastened in a detachable manner in welding head 2, the end of studholder 1 that is inserted in welding head 2 always being designated as data carrier 3. On welding head 2 there is attached a data-acquisition unit 4, which is acted upon by studholder 1, from which unit the acquired data are transmitted to a data-processing unit 5, which in turn sets the appropriate controlled-variables. FIG. 1 represents an analog coding. The rear end of studholder 1, that is designed as data-carrier 3, is here a tapered stub 6. Other stub dimensions, 6' or 6'', are indicated in broken lines, each being associated with a specific value. The stub diameter is sensed via a lever 7 with pivoting point 8, one of the ends of the lever resting—preferably under spring pre-tension—radially outward on stub 6; preferably, a roller 9 is provided at this end. The other end of the lever is coupled to the tap 9 of an adjustable resistor 10, which the tap is set to a certain value of resistance, depending on the deflection of lever 7 caused by the dimension of stub 6. The controlled variable is read via an operational amplifier and is processed, the charging voltage being read and adjusted as a function of the outside diameter of stub 6. The electric circuitry of the welding device is shown schematically in FIG. 1, the primary of a transformer 12 is connected to line voltage, its secondary being linked to a bridge rectifier 13 which is connected to the workpiece via a current-limiting resistor 14; and on the other side it is connected to the studholder or the welding-stud 15. A battery of capacitors 17 is connected in parallel to the welding path, formed by workpiece 16 and welding stud 15. A switch 18 is also included in the connection between the secondary of transformer 12 and bridge rectifier 13. The manner of operation of this arrangement is as follows:

Depending on the diameter of stud 6 of stud holder 1, a specific value of charging voltage is preset, via resistor 10. This voltage value is supplied via the operational amplifier 11 which is included in the circuit in parallel to capacitor battery 17. Switch 18 is then closed for a length of time sufficient to reach the preset voltage-value at capacitor battery 17. At that moment, switch 18—which is preferably designed as a Triac—opens. If the weld-stud 15 is then pressed against workpiece 16, the capacitor discharges and the welding process takes place. The procedure is then repeated.

Figure 2:
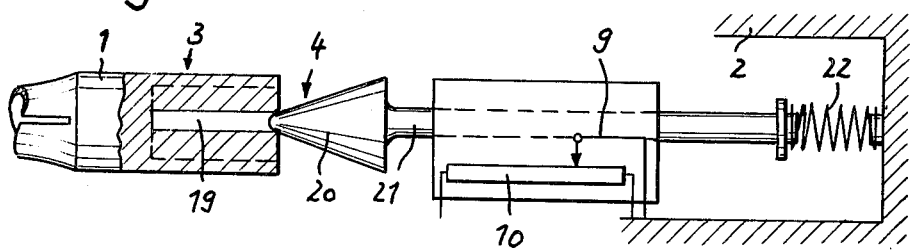
FIG. 2 illustrates partly in section and partly in elevation a modified form of components of the device of FIG. 1.

FIG. 2 shows a variant in which the charging voltage is read off and preset as a function of the diameter of a bore 19, made in stud holder 1. In other words, here the data carrier is bore 19, whose diameter is dimensioned larger or smaller, depending on the respective charging voltage appropriate for the associated stud size.

The diameter is read off by a conical sensor 20, which can penetrate more or less deeply into bore 19, depending on the bore's diameter. Sensor 20 is linked to a guide rod 21 which rests on welding head 2 via an intermediate spring 22. The guide rod is connected with the tap 9 of an adjustable resistor 10; regulating resistor 10 is held so it cannot be shifted, while tap 9 may be moved in relation to it by means of guide rod 21. The charging voltage is thus positively present in accordance with the diameter of bore 19. The value so read is processed as shown in FIG. 1.

In contrast to the analog coding shown in FIGS. 1 and 2, FIG. 3 schematically represents a digital coding. The circuit is constructed as in FIG. 2, the same identifying numbers being used. A second capacitor battery 17' is connected in parallel with capacitor battery 17, there being provided a switch 23 with which capacitor battery 17' can be connected or disconnected. Capacitor batteries 17 and 17' are linked together via a diode 24. A thyristor 25, functioning as a welding-current switch, is also included in the welding circuit. Data carrier 3 of stud holder 1 is formed by several trough-like indentations, as is further described in FIG. 5. Data-acquisition unit 4 encompasses several spring-action pins that probe the identations and transmit the digital information "0" or "1" to a microprocessor. Microprocessor 26 may advantageously be equipped with a keyboard 27 for the input of data or the fine adjustment of inputted data. Microprocessor 26 controls switches 18 and 23, as well as analog-to-digital converter 28. Converter 28 converts the digtal input-values of microprocessor 26 into analog values. FIG. 4 represents in principle a further design of analog coding. Here again, the same reference numbers as in the preceding figures are used. Stud holder 1 is here locked into a welding head 2 and displays at its rear end a stub 6 of smaller diameter and a second stub 6' of larger diameter. As in FIG. 1, stub 6 is provided to regulate the charging voltage, such regulation being achieved in analog fashion by resetting tap 9 of the charging-voltage regulating resistor 10. Lever 7', which corresponds to the larger-diameter stub 6', is used to operate a microswitch 29, which presets the capacitance of capacitor battery 17, as switch 23 did in FIG. 3. For instance, when the microswitch is operated by lever 7', the second capacitor battery 17' may be inserted into the circuit. Since welding head 2 including stud holder 1 move forward in an axial direction during the welding process and is then retracted, stubs 6,6' are long enough to fulfill their function, without interfering with the operating lift of welding head including stud holder. FIG. 5 represents once again, in detail, data carrier 3 with associated data-acquisition unit 4, in accordance with the example in FIG. 3. Here, the data carriers 3 are two troughs 30 cut into the shank of stud holder 1. Sensing switches 31 are provided to acquire these data, the switches resting on a pressure plate 32 via intermediate springs 33. The rear ends of switches 31, when in the raised position (cf. the two median sensing-switches 31), match appropriate contacts and in this position transmit to microprocessor 26 of FIG. 3 information such as "0". The two extreme sensing switches 31 dropped into the troughs 30; consequently, the appropriate contact pins on pressure plate 32 are released and transmit to the microprocessor the information "1". Instead of switches, inductive or capacitive initiators may be provided. Thus, sensing switches 31 serve to code several bits. FIG. 6 shows the possibility of optically acquiring digital data. In that case, a multiple arrangement of transversal ports 34 is provided in welding head 34, with a light-emitting diode 35 being provided at one end of the ports and a photodiode 36 at the other end of the channels. Stud holder 1, at the end that is designed as data carrier 3, also features ports 37; when the stud holder is inserted, ports 37 establish a connection between the two opposite ends of ports 34. When this connection has been established, the photodiode perceives the signals originating from the light-emitting diode and thus transmits the signal "1" to the microprocessor. If, as shown on the left side of FIG. 6, the stud holder does not feature a port 37 at the point in question, photodiode 36 does not receive the signal from light-emitting diode 35, and therefore transmits the signal "0" to the microprocessor. This design may also be constructed with a reflected-light barrier or with colored signals.

Figure 7:
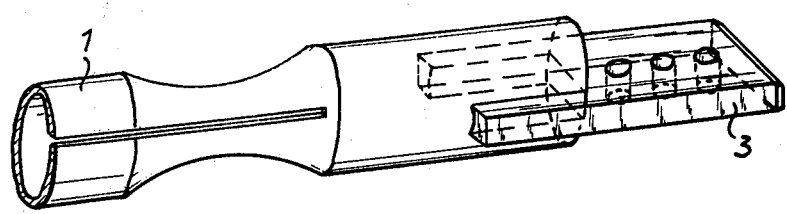

FIG. 7 shows another variant, in which stud holder 2 supports a data carrier 3 at one of its ends. Data carrier 3 may be, say, inserted. Its function may be carried out in a manner similar to the one depicted in FIG. 6, or the data carrier may constitute a "perforated tape".

Figure 8:
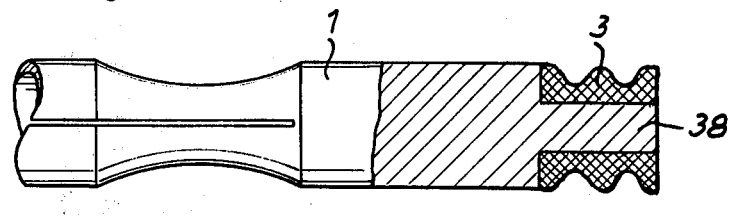

A further variant is represented in FIG. 8, where a plastic-material part with appropriate troughs (as, e.g., in FIGS. 3 and 5) is provided as data carrier 3, at the end of stud holder 1; the plastic-material part that functions as data carrier 3 is superimposed, in a detachable manner, on a rearward stub 38 of the stud holder. This design is particularly advantageous if the data to be inputted and acquired are not data from the respective stud holder 1, concerning the held stud 15, but data on workpiece 16, such as basic material, thickness or surface. In the case of another type of workpiece, it suffices to change the plastic-material part.

Figure 9:

Finally, FIG. 9 represents the principle of a further variant, in which stud holder 1 is designed as data carrier as represented, say, in FIGS. 3 and 5. Spring-action probing pins 39 are provided to probe troughs 39. The rear ends of the pins lie in a trough of welding head 2, which features, as data-acquisition unit 4, forked light-barriers lying crosswise to the longitudinal direction of the pins. As a function of the information of data carrier 3, the rear end of pins 39 either covers the associated twin light-barrier 40, or clears it. This function is used to transmit digital values.

Figure 10:
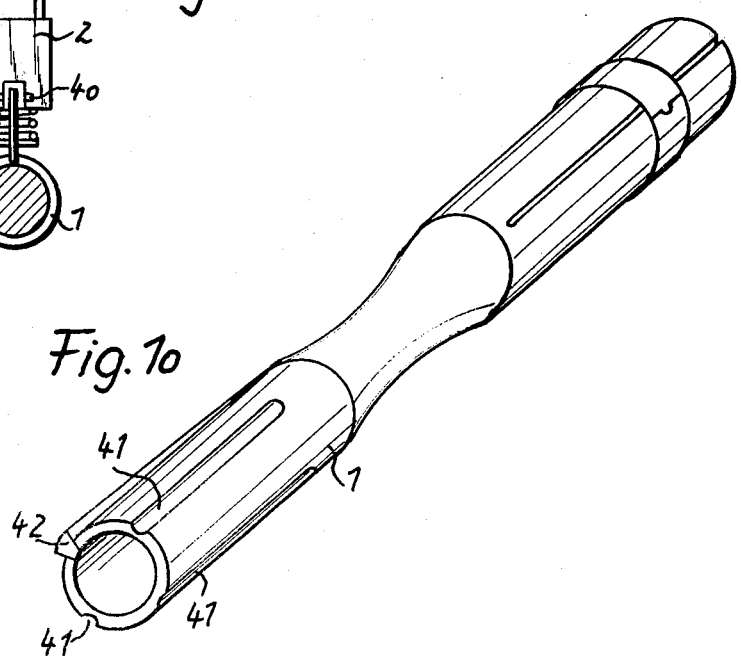

The invention has been described on the basis of examples of embodiment that are merely schematic; in the interest of simplification and to facilitate understanding, housing components and similar parts were left out. Finally, in FIG. 10 a stud holder 1 is represented in which longitudinal slits 41 at the rear end of stud holder 1 are provided as data carriers. In order to ensure that the stud holder is inserted in the correct position, a nose 42 is provided, which matches an appropriate groove of welding head 2 (not shown). The longitudinal slits 41 are open at the end. Data acquisition takes place as represented, for instance, in FIGS. 3 and 5, the corresponding sensing switches or pins being radially distributed around the stud holder.

All new characteristics disclosed in the specification and/or the drawings, singly or in combination, are considered to be essential to the invention.

I claim:

1. Electrical stud-welding device for welding studs of different diameters comprising a welding head and a stud holder detachably fastened thereto, means for regulating the stud-welding device with respect to a plurality of welding parameters including studs of different dimensions the stud holder serving as a data carrier and control for such variable welding parameters, data-acquisition units activated by the stud holder and location on a part of the stud-welding device, optionally on its welding head, and a centrally disposed data-processing unit associated with the stud-welding device for sensing stud size diameter, which unit controls the variable parameters in accordance with the predetermined sensed data.

2. Electrical stud-welding device according to claim 1, wherein one end of the stud holder is inserted into a recessed welding head, a data carrier forming a part of the stud holder and having a central bore into which a conical sensor projects and a data-acquisition unit arranged via an adjustable resistor to extend into the recess of the welding head and a spring between the base of the recess and the adjacent end of a guide rod connected to the base of said conical sensor.

3. Electrical stud-welding device according to claim 2, wherein the end of stud holder with its data carrier encompasses two data-carrier blocks arranged one after the other in an axial direction, of which one block, facing the front end of the stud holder, carries data specific to the stud size, and the other block, which faces away from the front end, carries specific data of the weld workpiece.

4. Electrical stud-welding device according to claim 3, wherein the data-carrier block carrying the data of the weld workpiece is detachably fastened to the stud holder.

5. Electrical stud-welding device according to claim 1, wherein that end of the stud holder with its data carrier has annular constrictions and projections of different widths for contact by the data-acquisition units.

6. Electrical stud-welding device according to claim 5, wherein the welding head wall recess is provided with transmitting and receiving data-acquisition units arranged facing one another, and which are covered or cleared by the stud holder responsive to the programming.

7. Electrical stud-welding device according to claim 6, wherein the front end of the stud holder is provided with radial or axial grooves or both, open in at least a radially outward direction, which operate as data carrier, said grooves matching data-acquisition units such as pins, supported externally on the stud-welding device, whereby the data-acquisition units are engageable in the data carriers during the welding lift to the welding head.

* * * * *